(12) United States Patent
Couckuyt et al.

(10) Patent No.: US 7,809,500 B2
(45) Date of Patent: Oct. 5, 2010

(54) RESOLVING DISCREPANCIES BETWEEN LOCATION INFORMATION AND ROUTE DATA ON A NAVIGATION DEVICE

(75) Inventors: Jeffrey Darren Couckuyt, Bothell, WA (US); Gregory P Baribault, Lynnwood, WA (US); Steven L Soden, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 11/052,994

(22) Filed: Feb. 7, 2005

(65) Prior Publication Data

US 2006/0178809 A1    Aug. 10, 2006

(51) Int. Cl.
*G01C 21/00* (2006.01)
*G08G 1/123* (2006.01)

(52) U.S. Cl. .................. 701/207; 701/200; 701/201; 701/202; 701/209; 701/210; 701/213; 701/214; 701/25; 701/26; 340/988; 340/995.19; 340/995.23; 340/995.25

(58) Field of Classification Search ............ 340/995.25; 701/200, 201–202, 205–210, 213–214
See application file for complete search history.

(56) References Cited

U.S. PATENT DOCUMENTS

| | | | | |
|---|---|---|---|---|
| 4,807,127 A | * | 2/1989 | Tenmoku et al. | 701/207 |
| 5,374,933 A | * | 12/1994 | Kao | 342/357.13 |
| 5,422,815 A | * | 6/1995 | Hijikata | 701/208 |
| 5,523,765 A | * | 6/1996 | Ichikawa | 342/451 |
| 5,774,824 A | * | 6/1998 | Streit et al. | 701/207 |
| 5,878,368 A | * | 3/1999 | DeGraaf | 701/209 |
| 5,961,571 A | * | 10/1999 | Gorr et al. | 701/207 |
| 5,983,158 A | * | 11/1999 | Suzuki et al. | 701/209 |
| 6,526,349 B2 | * | 2/2003 | Bullock et al. | 701/209 |
| 6,581,005 B2 | * | 6/2003 | Watanabe et al. | 701/210 |
| 6,615,133 B2 | * | 9/2003 | Moskowitz et al. | 701/209 |
| 6,615,135 B2 | * | 9/2003 | Davies | 701/213 |
| 6,633,812 B1 | * | 10/2003 | Martin et al. | 701/209 |
| 6,975,940 B1 | * | 12/2005 | Childs et al. | 701/209 |
| 2002/0019700 A1 | * | 2/2002 | Ishida et al. | 701/213 |
| 2002/0193944 A1 | * | 12/2002 | Stewenius | 701/213 |
| 2003/0158659 A1 | * | 8/2003 | Tompkins et al. | 701/209 |
| 2003/0158660 A1 | * | 8/2003 | Krull et al. | 701/209 |
| 2005/0075119 A1 | * | 4/2005 | Sheha et al. | 455/456.6 |
| 2006/0089787 A1 | * | 4/2006 | Burr et al. | 701/202 |

\* cited by examiner

*Primary Examiner*—Jack Keith
*Assistant Examiner*—Chuong P Nguyen
(74) *Attorney, Agent, or Firm*—Merchant & Gould

(57) ABSTRACT

A navigation system and method for resolving discrepancies between a reported position and route data is presented. Based on a reported position, the navigation system identifies prospective road segments within a radius of the reported position. For each road segment, the navigation system generates a series of scores according to various attributes, including the current heading, current speed, proximity of reported location to the prospective road, and the like. Historical scores are also generated based on historical information, i.e., previous navigation device locations. Scores are normalized such that they can be compared, and optionally weighted according to particular implementation details. After scores have been generated for each prospective road, the prospective road, and its determined location, with the best score is selected as the resolved, actual location.

19 Claims, 10 Drawing Sheets

RESOLVING DISCREPANCIES BETWEEN LOCATION INFORMATION AND ROUTE DATA ON A NAVIGATION DEVICE

FIELD OF THE INVENTION

The present invention relates to navigation systems, and more particularly, to a navigation device and method for resolving discrepancies between location information and route data on the navigation device.

BACKGROUND OF THE INVENTION

In recent years, electronic location devices, especially global positioning systems (GPSs), have become quite commonplace, and have been proven both useful and popular in many different applications or uses. Due to their ever-increasing deployment, most automobile drivers and passengers are now familiar with some type of navigation device that includes some type of positioning system. A navigation device is typically embodied as an integrated unit that provides up-to-the-minute routing information relative to the device's current position, including which roads to follow, where and when to turn, which lanes must be used, and the like.

FIG. 1 is a pictorial diagram illustrating an exemplary, integrated navigation device 100, such as those commonly found in the prior art. The exemplary navigation device 100 includes a display subsystem 102, which, in this example, is illustrating a map of the immediate surroundings of the navigation device, as well as route information for a user. As is typical with many navigation devices, an icon 104 illustrates the current location of the navigation device 100 (and presumably the vehicle in which it is located), as well as a defined route 106 a driver is to follow to arrive at a specified destination 108.

As those skilled in the art will appreciate, an exemplary navigation device 100 also frequently includes a number of user inputs, such as control buttons 110, and/or a keypad 112 that includes alpha-numeric keys for text and/or data entry. Of course, those skilled in the art will appreciate that navigation devices come in a variety of configurations with numerous options. The present illustration is meant only as an example, and should not be construed as limiting upon the present invention.

While most location devices, such as a GPS or wireless telephone, could be designed to be very accurate in determining the location of the device, current location devices are known to include some degree of inaccuracy. For example, most GPS owners know that their device will report a geographic position (in terms of latitude and longitude) for the device that is only accurate within some tolerance. In fact, for most GPS systems, the reported position is accurate within a radius of 10 to 100 meters of the actual position. While in many cases this inaccuracy is unimportant, when the location device is part of a navigation system, and the reported position is 10 meters "off" the actual position, this may cause the navigation system to illustrate a corresponding vehicle's position as traveling down the middle of a busy office lobby, rather than on a street in front of the building.

FIG. 2 is a pictorial diagram illustrating an exemplary map 200 displayed by a navigation system, such as navigation device 100 of FIG. 1, and further illustrating the problems associated with the inaccuracies of location devices. In particular, the navigation system, in the course of providing up-to-date navigation information to the driver of an automobile, will typically periodically obtain the current position from its location subsystem (such as a GPS unit). Furthermore, in addition to the inaccuracies of the location subsystem, due to the inaccuracies of the navigation system's data, the exact location 202 will fall somewhere off of an established road. For instance, assume that reported location 202 is the most recent position obtained by an integrated navigation device. As can be seen, location 202 does not correspond to any established road. Instead, there are five different road segments, including road segments 204, 206, 208, 210, and 212, that may fall within the understood margin of error. Clearly, this presents a problem for the navigation system, which may ultimately report to the user that the vehicle is traveling down a road, or through a building, that it is not.

Of course, the map, or route data, that the navigation system uses may also be in error. However, no matter what the error, it is very disconcerting for the navigation system to report that the driver is navigating the vehicle through a lake, down the wrong way of a one-way street, or in the middle of an office building, when in fact, it is not true. Accordingly, what is needed is a navigation system, and a method for implementation on a navigation system, that efficiently resolves discrepancies between a location position as reported by a location service, and the route data relied upon by the navigation system. The present invention addresses this and other issues found in the prior art.

SUMMARY OF THE INVENTION

According to aspects of the present invention, a navigation system for resolving discrepancies between a reported location and route data is presented. The navigation system includes a processor and a memory. The navigation system also includes a location subsystem. The location subsystem provides a reported location to the navigation system. The navigation system is configured to resolve discrepancies between the reported location and route data into a route location on a road identified in the route data, by, first, identifying prospective roads as those roads in the route data that have a road segment within a radius of the reported location. For each identified prospective road, the navigation system generates a score for the prospective road in relation to the reported location. The navigation system is configured to then select the prospective road with the best score, and identify a position on the selected prospective road as the resolved route location.

In accordance with additional aspects of the present invention, a navigation system for resolving discrepancies between a reported location and route data is presented. The navigation system includes a processor and a memory. The navigation system also includes a location subsystem. The location subsystem provides a reported location to the navigation system. The navigation system is configured to resolve discrepancies between the reported location and route data into a route location on a road identified in the route data, by, first, identifying prospective roads as those roads in the route data that have a road segment with a radius of the reported location. For each identified prospective road, the navigation system is configured to generate a plurality of scores for the prospective road in relation to the reported location, normalize each of the plurality of scores into a common range of values, and determine an overall score for the prospective road according to the commutation of the normalized scores. After determining overall scores for each of the prospective roads, the navigation system is further configured to select the prospective road with the best overall score, and identify a position on the selected prospective road as the route location.

In accordance with yet further aspects of the present invention, a method, executable by a navigation system, for resolving discrepancies between a reported location and route data, is presented. A reported location is obtained from a location subsystem. Route data identifying a plurality of roads is also obtained. Prospective roads in the route data that have a road segment within a radius of the reported location are identified. For each identified prospective road, a plurality of scores for the prospective road in relation to the reported location are generated. Each of the plurality of scores are normalized into a common range of values. An overall score for the prospective road according to the cumulation of the normalized scores is determined. After determining an overall score for each prospective road, the prospective road with the best overall score is selected, and a position on the selected prospective road is identified as the resolved route location.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As indicated above, the present invention is directed at a navigation system that provides efficient, improved resolution of discrepancies between location information from a location service, such as a GPS, and route data. As indicated above, in order to resolve the discrepancies between a reported location and route data, a navigation system is adapted according aspects of the present invention, such that for each reported location, the navigation system generates a variety of individual scores for each prospective road, collects the individual scores, and selects the prospective road with the best score as the road on which the vehicle is located, referred to hereafter as the "snap-to" road. It should be appreciated that while the term "road" is used throughout this description, it is used as a generic term for a traverseable route, and used for simplicity purposes. In fact, the term "road" is intended to include almost any type of traverseable route including, but not limited to, streets, paths, trails, walk-ways, rail lines, subways, and the like. Additionally, while the term "vehicle" is used, and often used interchangeably with the term "automobile," it is also for illustration and simplicity in description purposes. Vehicle may include, but is certainly not limited to, automobile, motorcycle, boat, bicycle, and the like.

Figure 3:
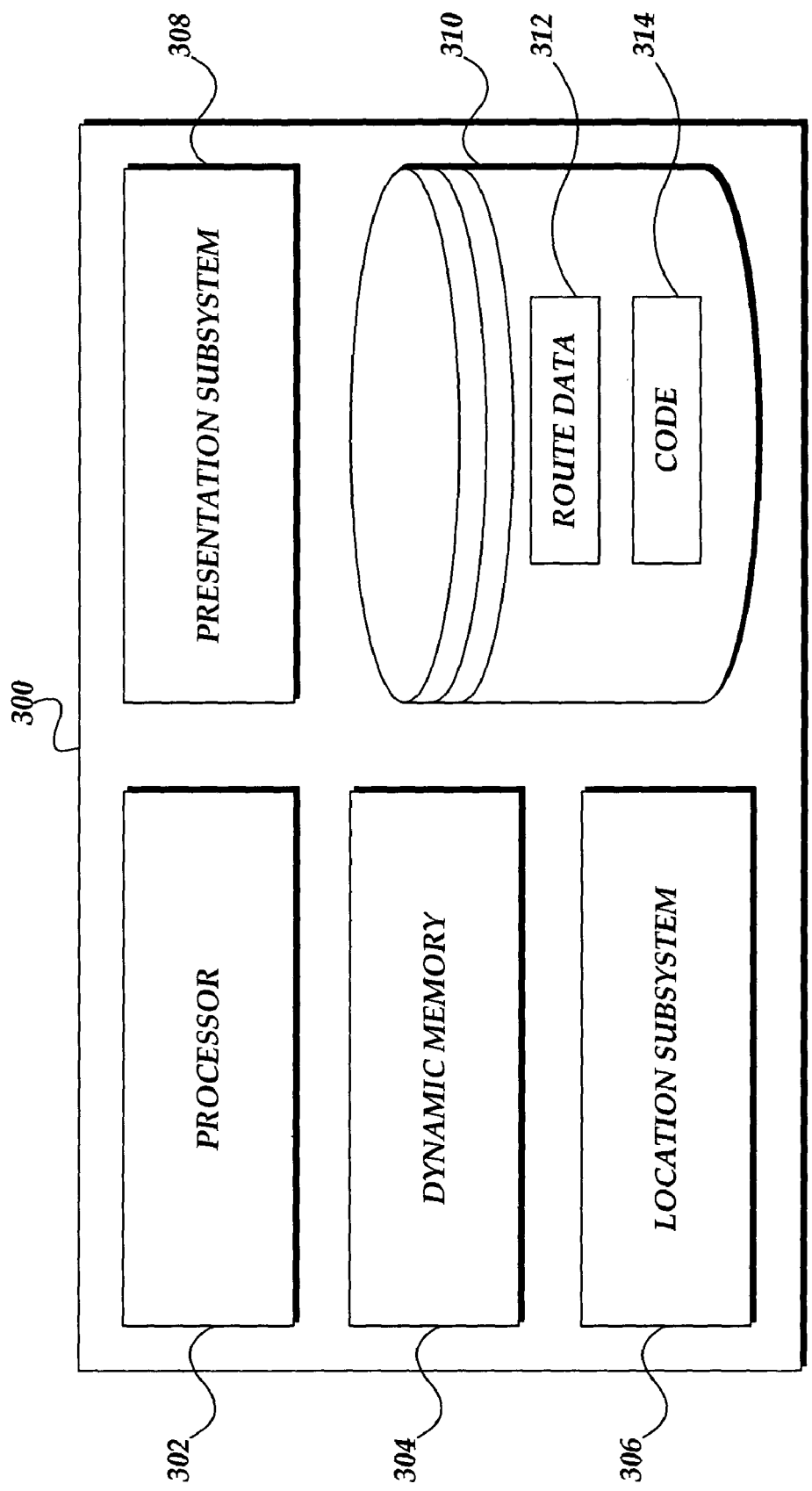
FIG. 3 is a block diagram illustrating exemplary components of a navigation system suitable for implementing aspects of the present invention.

FIG. 3 is a block diagram illustrating exemplary components of a navigation system 300 suitably configured for implementing aspects of the present invention. The exemplary navigation system 300 includes a processor 302 that executes code 314 for resolving discrepancies between a reported location and route data 312. The navigation system 300 also includes a dynamic memory 304, as well as a more permanent storage 310. As those skilled in the art will appreciate, the dynamic memory 304 is typically used by the processor 302 as short term memory, frequently for temporary variable and data storage, such as prospective road scores (discussed below), but may also be used to store the code 314 for resolving discrepancies between a reported location and route data 312. Additionally, the storage 310 may be non-volatile memory, disk storage, or remote storage. Typically, the code 314 is stored in the storage 310, but, in alternative embodiments, may reside in read-only memory (not shown). Still further, as those skilled in the art will appreciate, while they are illustrated as logically separate in FIG. 3, in an actual embodiment the dynamic memory 304 and storage 310 may be the same memory/storage structure.

The exemplary navigation system 300 also includes a location subsystem 306. The location subsystem may be a GPS unit, or alternatively, some other location determination service or device. In fact, the location subsystem 306 may actually be a communication link with an external location determination service that periodically provides reported locations to the navigation system 300.

Figure 1:
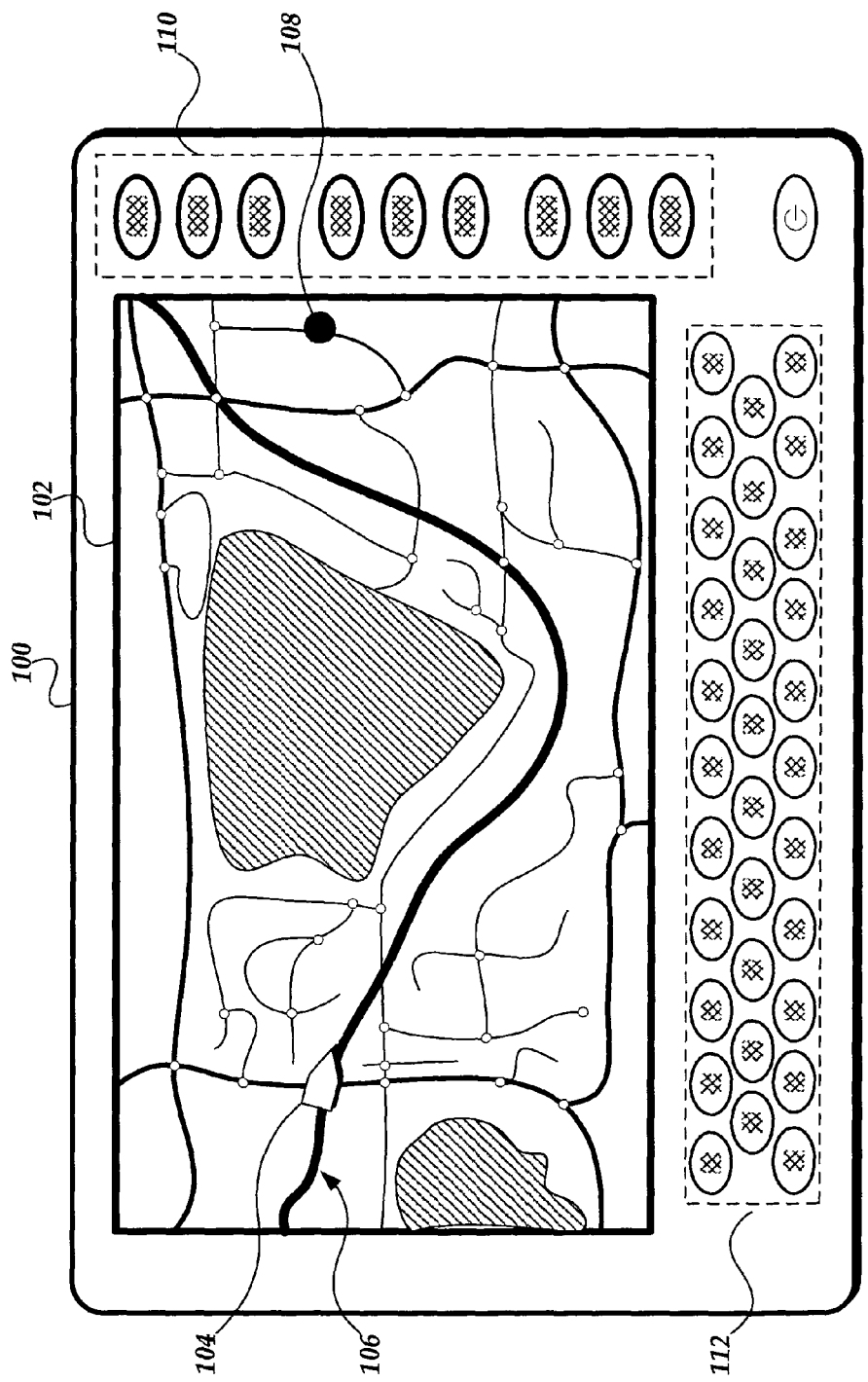
FIG. 1 is a pictorial diagram illustrating an exemplary navigation device as found in the prior art.
Figure 2:
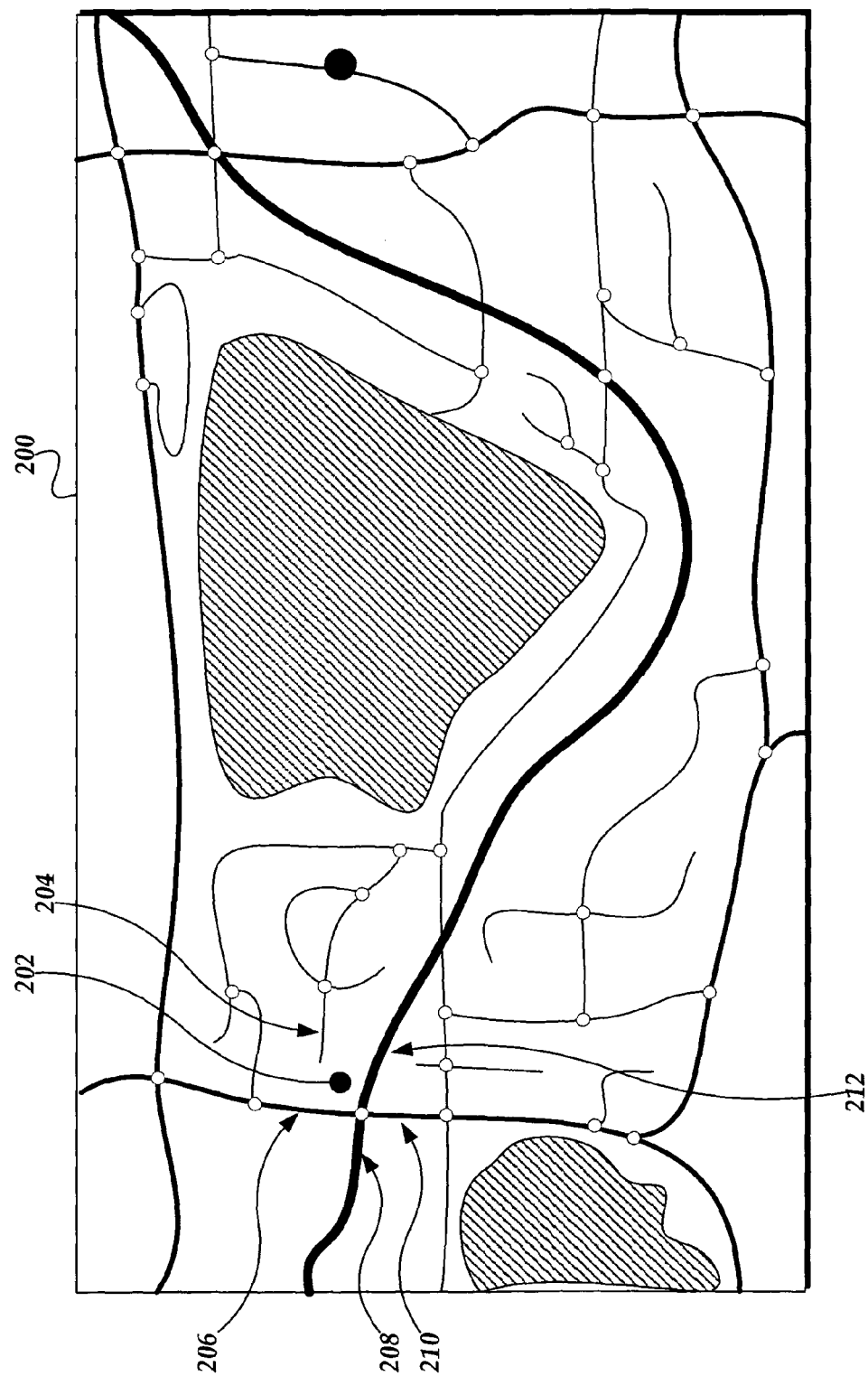
FIG. 2 is a pictorial diagram illustrating an exemplary map displayed by a navigation device, such as the navigation device of FIG. 1, and further illustrating the problems associated with the inaccuracies of location services.

The exemplary navigation system 300 also typically includes a presentation subsystem 308. As shown in FIG. 1, a presentation subsystem is frequently a graphics display system that can illustrate maps or routes, as well as text. However, the present invention is not limited to a graphics display system. For example, the presentation subsystem 308 may be a communication channel that provides navigation information to an external device or system.

As already indicated above, the storage 310 will typically include route data 312, for determining and displaying a present location, and for determining a navigation information for navigating a potential path between an origin and destination. However, in an alternative embodiment, the navigation system 300 may obtain route data 312 from an external source, and store that data temporarily in the dynamic memory 304. For purposes of the remaining discussion, route data 312 comprises, but is not limited to, information regarding roads (or, more particularly, road segments); locations, directions and geometries of the roads; inter-connections between the roads; and attributes describing road segments including, but not limited to, speed limit, turn restrictions, type of road, and the like.

While various components of an exemplary navigation system have been presented and described, it should be appreciated that the above-identified components of the exemplary navigation system are logical components, not necessarily actual components, and may be divided or combined into any number of actual components. Furthermore, a typical navigation system may include other components not described herein. Accordingly, the above-described exemplary navigation system 300 should be viewed as illustrative only, and not construed as limiting upon the present invention.

Figure 4A:
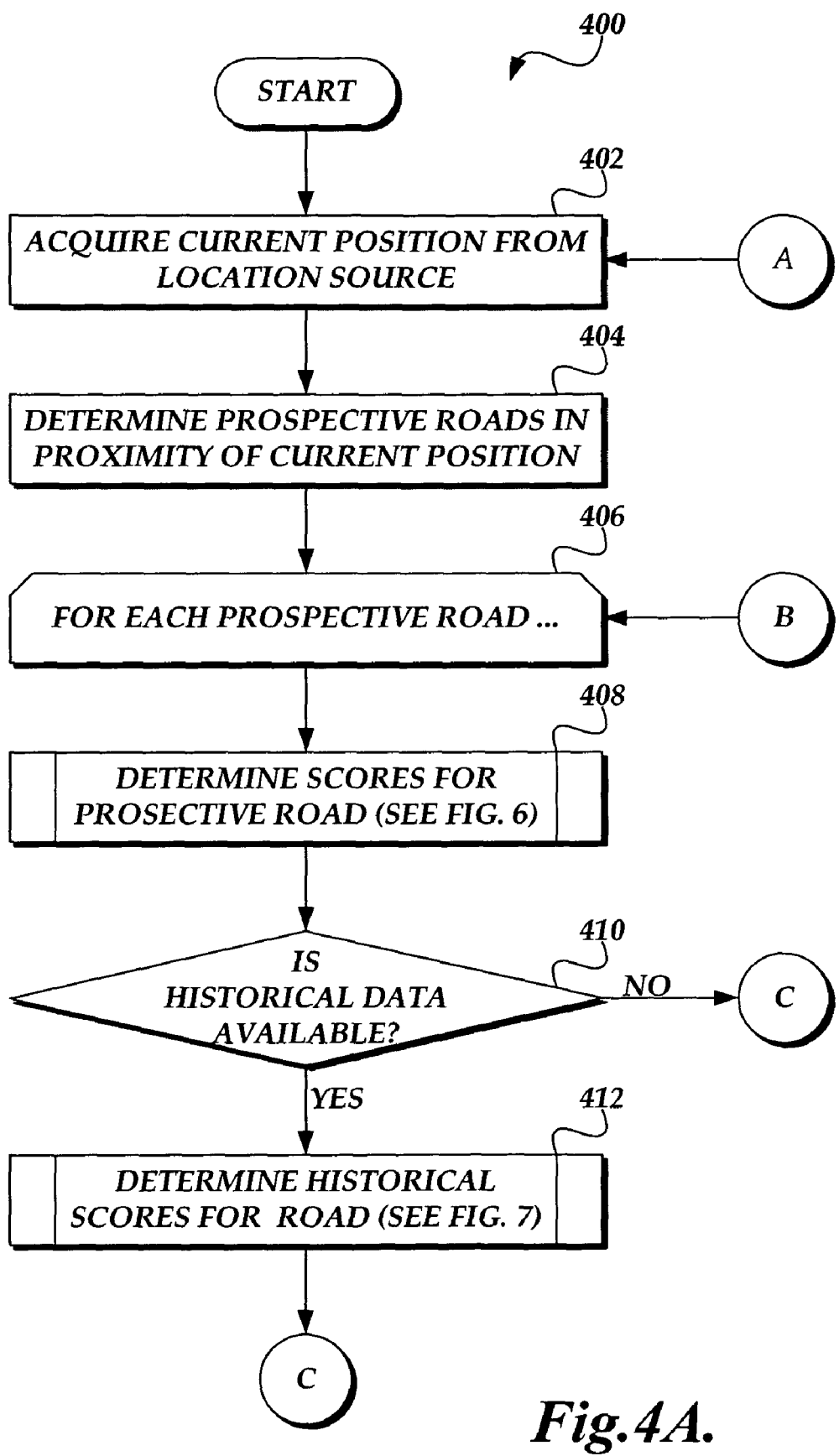
FIGS. 4A-4C are a flow diagram illustrating an exemplary routine for resolving discrepancies between location position information and route data in providing up-to-date navigation information.
Figure 4B:
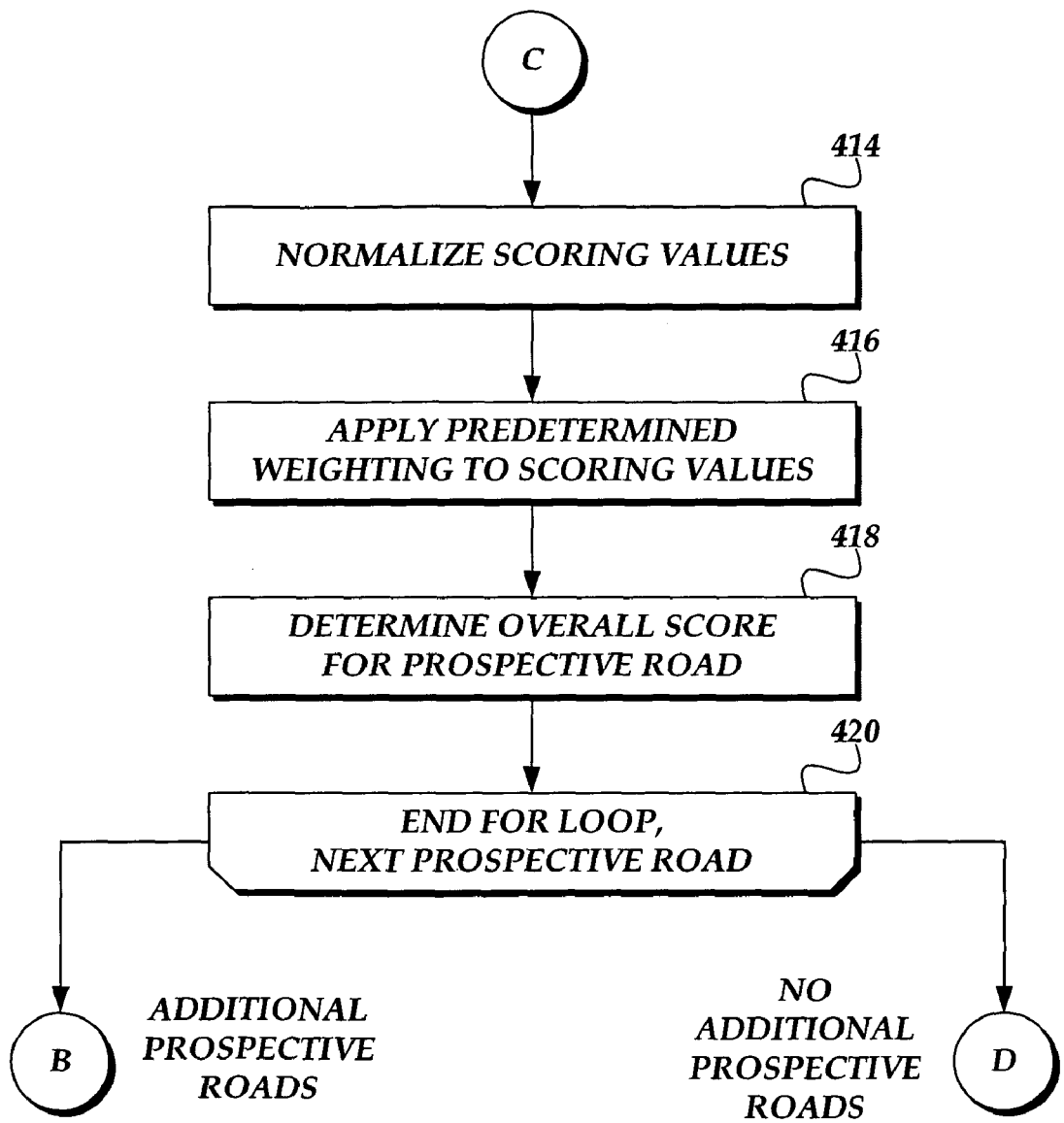
Figure 4C:
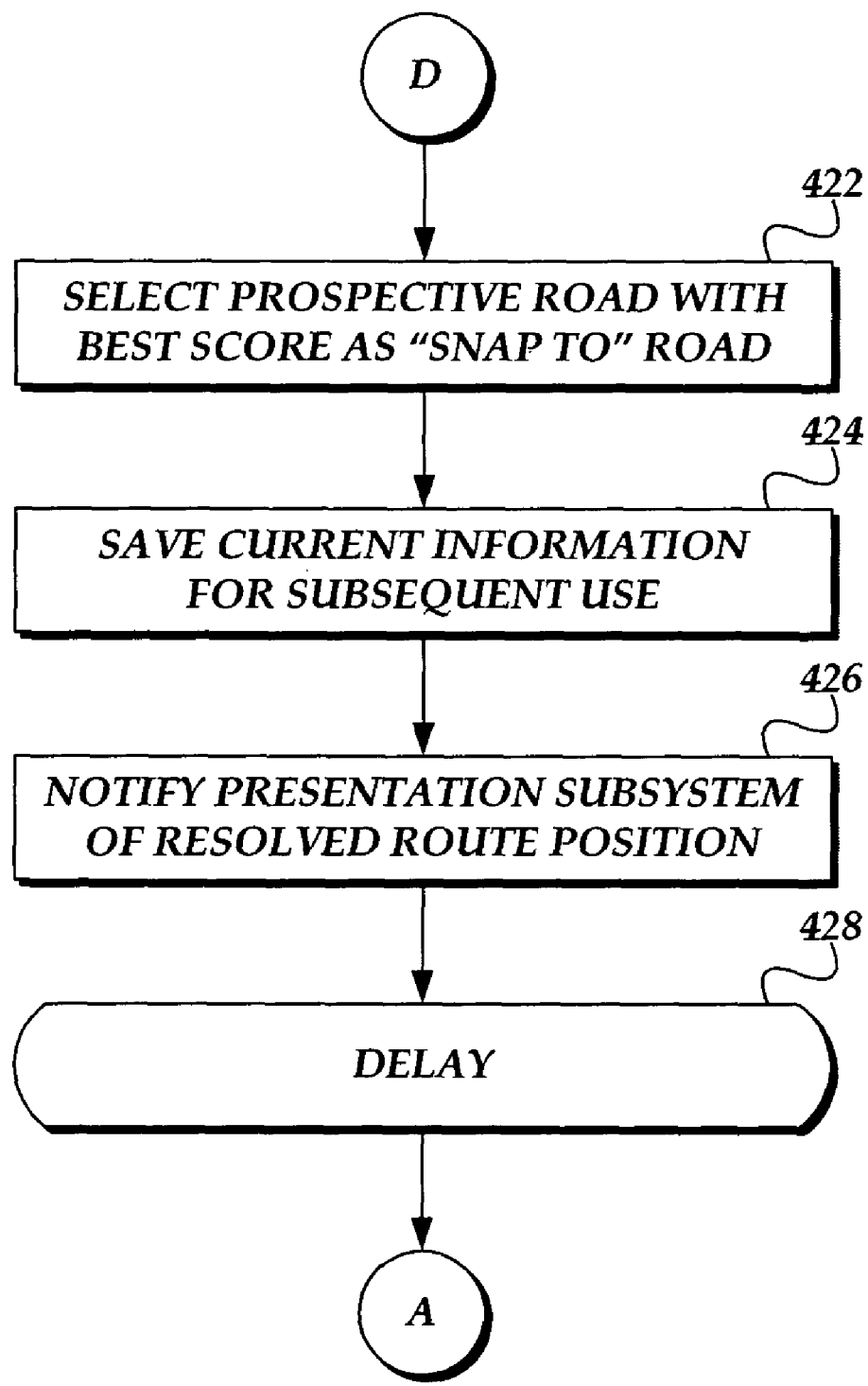

As indicated above, the navigation system 300 executes code 314 that enables it to resolve the discrepancies between a reported location and the route data 312. FIGS. 4A-4C are a flow diagram illustrating an exemplary routine 400, suitable for implementation by a navigation system 300, for resolving discrepancies between a reported location and route data 312 as it functions to provide up-to-date navigation information to a user or external system. As a preliminary matter, those skilled in the art will appreciate that a typical navigation system 300, especially an integrated unit such as navigation device 100 (FIG. 1), is frequently designed to operate in a continual manner, i.e., once initialized and operating, the navigation system continually provides navigation or position information to the driver or user of the system. Accordingly, exemplary routine 400 includes a begin terminal, but does not have an end terminal. Instead, the routine 400 is shown as continually operating, presumably until the navigation system 300 is powered down.

Figure 5:
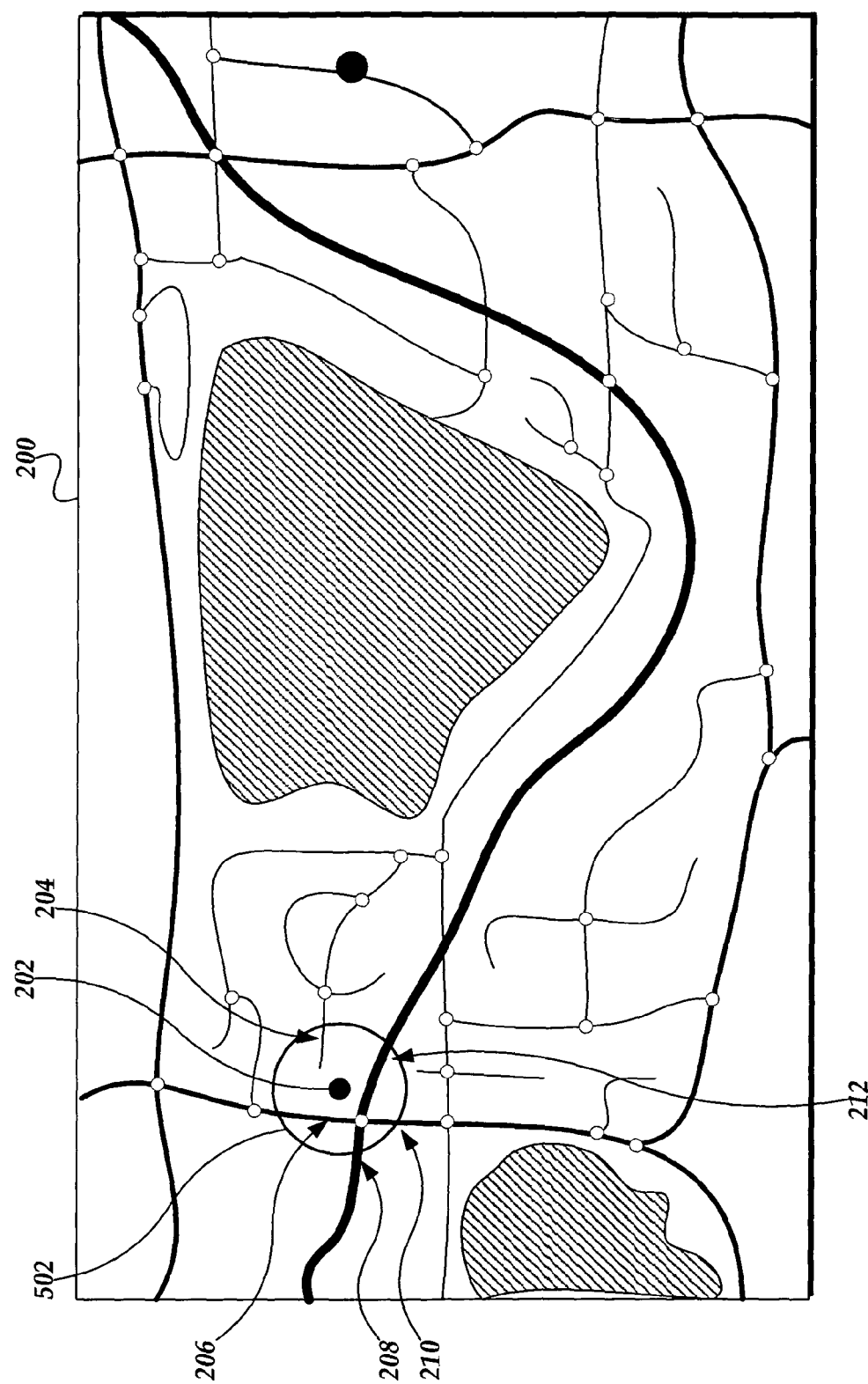
FIG. 5 is a pictorial diagram illustrating the exemplary map of FIG. 1, and illustrating the selection of roads within a predetermined radius of the reported navigation position.

Beginning at block 402, the navigation system 300 acquires a reported position/location from a location source, such as the location subsystem 306. Typically, this reported position will be given in terms of a coordinate comprising a latitude and longitude value. As indicated above, other information, such as speed limits, road heading, elevation, and the like may also be retrieved at that time. At block 404, the exemplary routine 400 determines/identifies all prospective roads that lie within a predetermined radius of the reported position. For example, FIG. 5 is a pictorial diagram illustrating the exemplary map 102 shown in FIG. 1, and further illustrating the selection of prospective roads within a predetermined radius of the reported position. As indicated above, in one embodiment, those roads that lie within a predetermined radius, such as radius 502, are considered prospective roads in reconciling the discrepancies between a reported location and route data. More particularly, assuming that location 202 is the reported location/position, and that radius 502 identifies the predetermined radius to consider, any one of five road segments, including road segments 204, 206, 208, 210, and 212, should be considered as prospective roads. It should be noted, however, that in an alternative embodiment, the actual radius may not be predetermined, but rather determined at the time of selecting prospective roads. In particular, in one embodiment, the radius used for determining whether a road is a prospective road is determined according to the device speed. Accordingly, while in an actual embodiment, a predetermined radius is used, it should be viewed as illustrative, and not limiting upon the present invention.

With reference to FIG. 4A, at control block 406, a "for" loop is begun for each of the prospective roads identified in block 404. In other words, as those skilled in the art will readily recognize, this "for" loop is a control structure that carries out the steps between its start (control block 406) and a corresponding end (control block 420) for each of the prospective roads. The "for" loop iterates through each of the prospective roads, performing the steps in the construct.

As a first step in the "for" loop, at block 408, the exemplary routine 400 determines scores for a prospective road. Determining scores for a prospective road is described in greater detail with regard to FIGS. 6A and 6B.

Figure 6A:
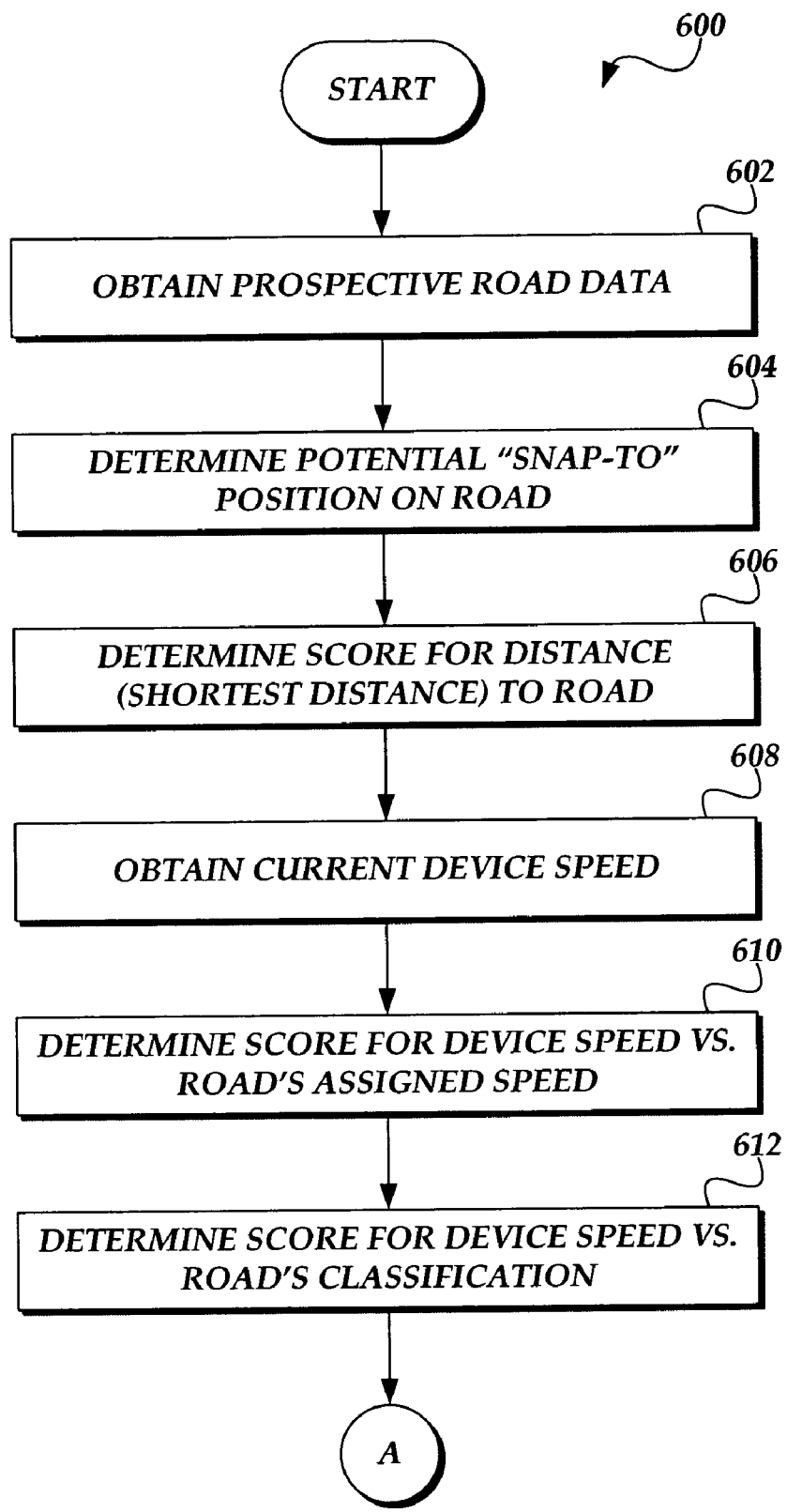
FIGS. 6A and 6B are a flow diagram illustrating an exemplary subroutine, suitable for use by the exemplary routine of FIG. 4, for determining scores for prospective roads.
Figure 6B:
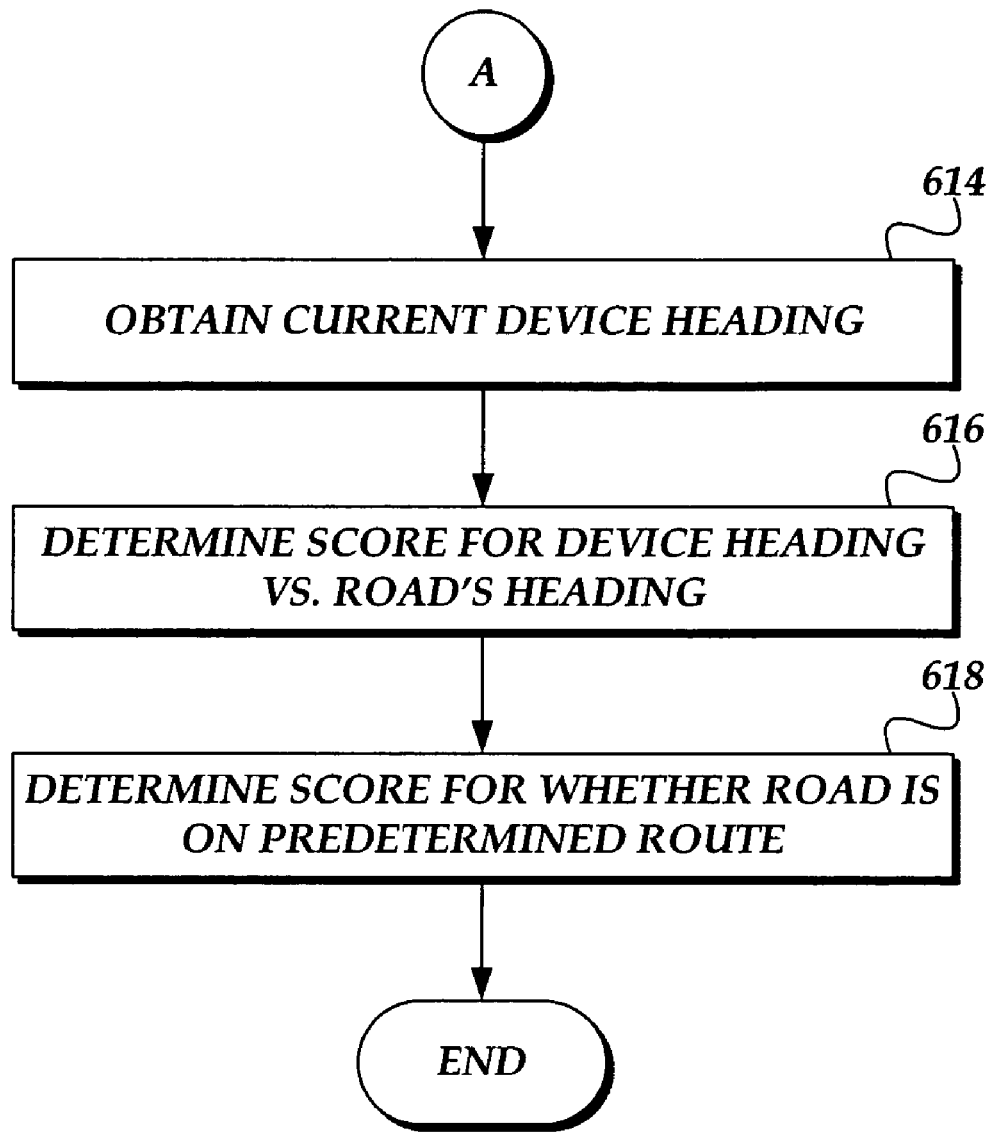

FIGS. 6A and 6B are a flow diagram illustrating an exemplary subroutine 600 suitable for use by the exemplary routine 400 of FIG. 4, for determining scores for a prospective road. Beginning at block 602, the exemplary subroutine 600 obtains road data corresponding to the prospective road. Typically, the subroutine 600 will obtain the prospective road's data from the route data 314 in the storage 310.

At block 604, a route position on the prospective road is determined according to the shortest distance between the reported position and the prospective road. This route position represents the location which, if the routine 400 ultimately determines that this prospective road is the "snap-to" road to which the reported location belongs, will become the "snap-to position", or the "official", position for determining further routing information. At block 606, a distance score is determined according to the distance between the reported position and the prospective road. More particularly, a distance score is determined according to the distance between the reported position and the "snap-to" position on the prospective road.

At block 608, the current device speed (presumably using the navigation device or some other related tracking module), is obtained. Typically, the current device speed is provided by the location subsystem 306, but in an alternative embodiment, may be obtained from a vehicle's speedometer. At block 610, a device speed score is determined according to the device speed obtained at block 608 and the prospective road's assigned speed, if available. This type of score can be especially useful in evaluating whether the prospective road is the actual road. For example, if the prospective road is a residential road with a posted 25 mile per hour speed limit, and the current device speed is 55 miles per hour, this may strongly indicate that the prospective road is not a suitable candidate as the "snap-to" road and it would receive a lower score.

At block 612, a road classification score is determined according to the device speed and the prospective road's classification. This is not the same as comparing device speed to posted speed. Rather, it is a comparison/score considering the speed with known attributes of the prospective road. As an example, if the device speed is 45 miles an hour, and the road's classification is listed as a one-lane dirt road, the prospective road may merit a lower score as being less likely.

At block 614, the current heading for the navigation device (or navigation system) is obtained. At block 616, a device heading score is determined according to the device heading obtained in block 614 and the prospective road's heading. According to one embodiment, the device heading score is determined according to the difference in angle between the two headings. For example, if the device heading is 45°, and the prospective road's heading is 80°, the prospective road would very likely receive a poor score. On the other hand, if the device heading is 45°, and the prospective road's heading is 42°, a difference of just 3°, then a relatively high score may be merited.

At block 618, a route score is determined for whether the prospective road is on, or part of, a pre-determined route. As those familiar with navigation devices will recognize, navigation devices are frequently used to plot out prospective routes between an origin and destination. Thus this route, being the pre-determined route, may provide a strong indication as to which of the prospective roads should be considered as the "snap-to" road.

After determining the various scores described above, the exemplary routine 600 terminates.

Returning again to FIG. 4, after determining the various scores for the prospective road, at decision block 410, a determination is made as to whether historical data is available. More particularly, a determination is made as to whether the navigation system has retained historical data as to previous route positions. If historical data is not available, the exemplary routine 400 proceeds to block 414 (FIG. 4B). However, if historical data is available, at block 412, a series of historical scores are determined for the prospective road. Determining historical scores for the prospective road is described in greater detail in regard to FIG. 7.

Figure 7:
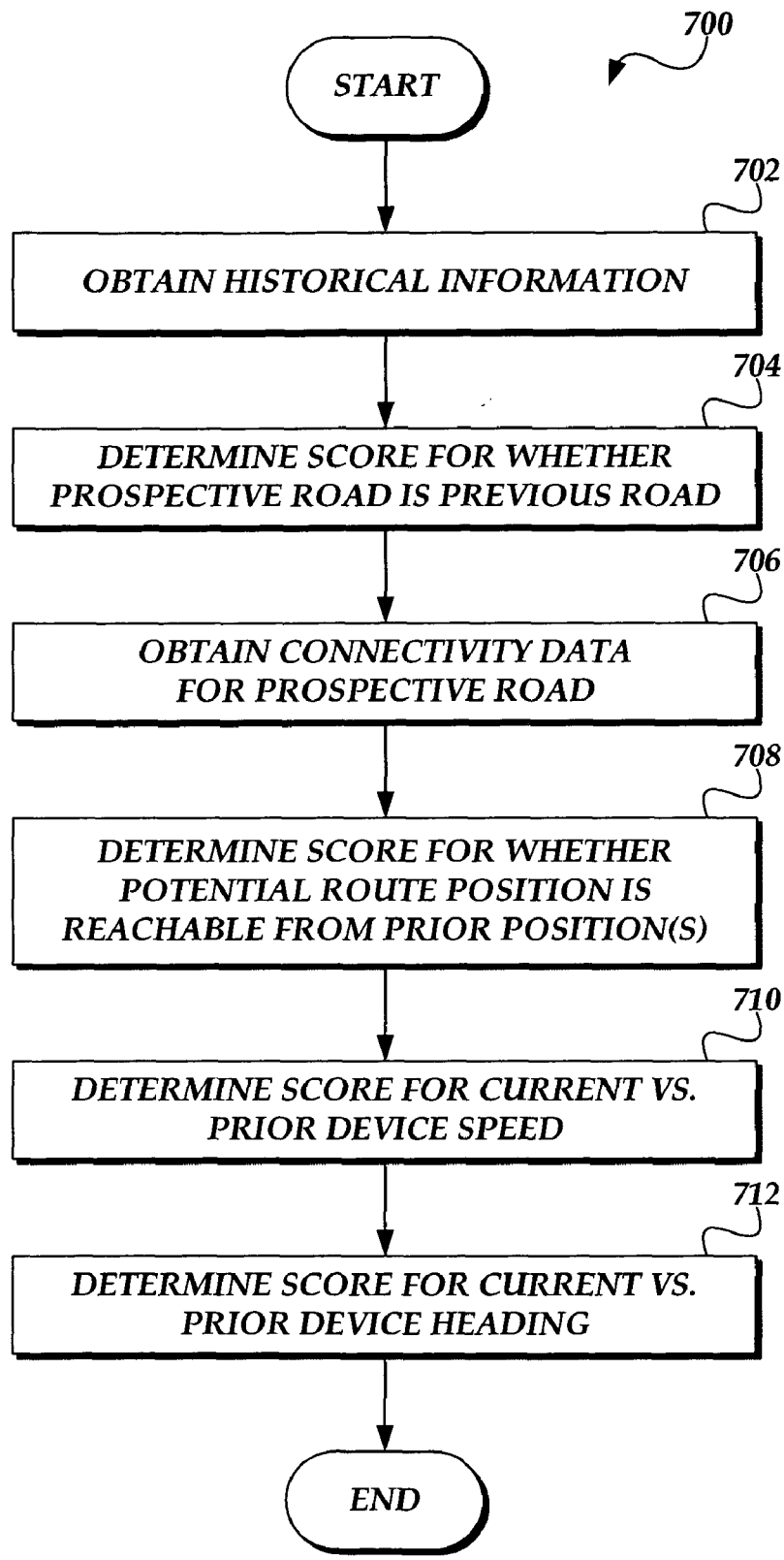
FIG. 7 is a flow diagram illustrating an exemplary subroutine, suitable for use by the exemplary routine of FIG. 4, for determining scores based on historical data for prospective roads.

FIG. 7 is a flow diagram illustrating an exemplary subroutine 700, suitable for use by the exemplary routine 400 of FIG. 4, for determining historical scores based on historical data associated with the prospective road. Beginning at block 702, historical data associated with previous route positions is obtained. In one embodiment, historical data includes information regarding previous route positions. In addition to the route position, information associated with each saved route position, such as device speed, heading, "snap-to" or "official" position, and the like, will typically be stored as part of the historical data. For example, in an actual embodiment, up to three route positions are stored for subsequent use and evaluation, either in the dynamic memory 304 or storage 310. However, any number of historical positions may be used to determine historical scores, and the present invention should not be limited to any particular number.

At block 704 a continuity score is determined for whether the prospective road is the same as the previous road in the historical information. This is based on observed information that once on a road, a driver will tend to stay on that road for some time. At block 706, the exemplary routine 700 obtains connectivity data for the prospective road. Connectivity data represents information in the route data 312 that indicates whether various road segments are connected, or interconnected. In other words, the connectivity data includes the data from which it can be determined whether one can actually navigate from one road segment to another. Correspondingly, at block 708, a connectivity score is determined as to the likelihood of reaching the prospective route position on the prospective road from the previous, historical route positions.

At block 710, a historical speed score is determined according to the current speed versus the historical speeds of the navigation device. Similarly, at block 712, a historical heading score is determined as to the current navigation device heading versus the historical navigation device headings. After determining these historically based scores, the exemplary routine 700 terminates.

Returning again to FIGS. 4A-4C, after having determined historical scores for the prospective road, at block 414 (FIG. 4B), the previously determined scores are normalized. Normalizing the scores is simply taking each determined score and placing it in a range of values that can be compared to other scores. For example, with regard to the distance between the reported location and the shortest distance to the prospective road, that distance may be twenty meters. However, it is unreasonable to compare a raw score of twenty meters to the difference, in degrees, between the navigation device heading and the prospective road heading. Thus, normalizing a score will typically involve translating a particular score into a range of values such that can be generally compared to other scores. Normalizing a score, in one embodiment, entails translating raw scores into a value between 0.0 and 1.0. Alternatively, normalizing the scores may involve translating the raw scores into numbers between 0 and 100. Any normalization scale may be utilized in the present invention, and the invention is not limited to any particular normalization scale. Furthermore, a particular score may be normalized according to a combination of multiple factors that may or may not directly immediately related to the score to be normalized. For example, when normalizing a score for device heading, consideration may be given as to the device speed (or speed score) since at low speeds, the device heading is frequently inaccurate.

After normalizing the scores, at block 416, the exemplary routine applies optional pre-determined weightings, typically through the application of some weighting function, to some or all of the normalized scores/values. Weighting particular scores provides an opportunity to give more value to any particular score. For example, distance from the reported location to this prospective road may be valued higher than the reported device speed, such that if the distance between the reported position and the prospective route position is very small, this may be valued higher than if the navigation device speed is lower than the speed posted for the prospective road. By weighting the individual scores, particular implementations can be fine tuned according to implementation preferences.

While separated into two logical steps, those skilled in the art will appreciate that normalizing and weighting may be implemented in a single step. Accordingly, the separation of normalizing and weighting should be viewed as illustrative only, and should not be construed as limiting upon the present invention.

After normalizing and weighting the scoring values, the overall score for the prospective road is determined. In one embodiment, this overall score is a sum of all of the normalized, weighted scores.

At control block 420, which corresponds to the end of the "for" loop begun in control block 406, the routine 400 either returns back to control block 406 to process and score other prospective roads, or proceeds to block 422 (FIG. 4C), which would indicate that all of the prospective roads have been scored.

At block 422, after all prospective roads have been scored, the exemplary routine 400 selects the prospective road with the best overall score as the "snap-to" road. At block 424, the current information relating to this selection, such as the "snap-to" road, route position, device heading, speed, and the like, is stored as historical data for subsequent use (such as described in regard to FIG. 7). At block 426, the exemplary routine 400 notifies the presentation subsystem 308 of the current route position, along with any other information that is typically presented to the display subsystem, for display update purposes. At delay block 428, the exemplary routine 400 delays for some predetermined amount of time, or until the next reported location/position is available. Thereafter, the routine returns again to block 402 and the process repeats.

While the various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer-implemented navigation system for resolving discrepancies between a reported location and route data, the navigation system comprising:
   a memory storage; and
   a processing unit coupled to the memory storage, wherein the processing unit is configured to:
   receive a reported route location from a location subsystem,
   determine a radius for identifying a plurality of prospective roads within the radius based on a current speed obtained from one of the navigation system, the location subsystem, and a speedometer of a vehicle in operation with the navigation system,
   identify a plurality of prospective roads in the route data onto which the navigation system could resolve the reported location to the route location, generate a plurality of aspect related scores for each identified prospective road according to a plurality of aspects of each identified prospective road, obtain historical data corresponding to a plurality of previous route locations for each identified prospective road, generate a historical score for each identified prospective road according to the obtained historical data, generate an overall score for each identified prospective road according to the plurality of aspect related scores of each identified prospective road and the historical score by:

normalizing the plurality of aspect related scores of each identified prospective road and the historical score, wherein normalizing the plurality of aspect related scores of each identified prospective road and the historical score comprises translating each of the plurality of aspect related scores into a common range of values, and weighting at least one of the plurality of aspect related scores of each identified prospective road and the historical score, selecting a prospective road of the plurality of prospective roads with the best score, and identifying a position on the selected prospective road as the resolved route location.

2. The navigation system of claim 1, wherein the route data is stored in the memory storage.

3. The navigation system of claim 1, wherein the processing unit is further operative to identify those roads in the route data that fall within a pre-determined radius of the reported location that is not based on the current speed.

4. The navigation system of claim 1, wherein the processing unit being operative to generate the plurality of aspect related scores for each identified prospective road according to the plurality of aspects of each identified prospective road comprises the processing unit being further operative to:

obtain a first heading for the reported location;

obtain a second heading for the prospective road;

determine a difference between the first heading for the reported location and the second heading for the prospective road; and generate an aspect related heading score according to the difference between the first heading for the reported location and the second heading for the identified prospective road.

5. The navigation system of claim 4, wherein the processing unit being operative to generate the plurality of aspect related scores for each identified prospective road according to the plurality of aspects of each identified prospective road further comprises the processing unit being operative to:

determine a closest point on each identified prospective road to the reported location;

determine a distance between the identified closest point on each identified prospective road and the reported location; and generate an aspect related distance score according to the distance between the identified closest point on each identified prospective road and the reported location.

6. The navigation system of claim 5, wherein the processing unit being operative to generate the plurality of aspect related scores for each identified prospective road according to the plurality of aspects of each identified prospective road further comprises the processing unit being operative to:

determine whether each identified prospective road is part of a predetermined route; and generate an aspect related predetermined route score based on whether each identified prospective road is part of the predetermined route.

7. The navigation system of claim 6, wherein the processing unit being operative to generate the plurality of aspect related scores for each identified prospective road according to the plurality of aspects of each identified prospective road further comprises the processing unit being operative to:

obtain the current speed;

obtain an assigned road speed for each identified prospective road; and generate an aspect related road speed score based on a difference between the assigned road speed and the current speed.

8. The navigation system of claim 7, wherein the processing unit being operative to generate the plurality of aspect related scores for each identified prospective road according to the plurality of aspects of each identified prospective road further comprises the processing unit being further operative to:

obtain a road classification for each identified prospective road; and generate an aspect related road classification score according to a relationship of the current speed to the road classification.

9. The navigation system of claim 1, wherein the processing unit being operative to generate the overall score for each identified prospective road according to the plurality of aspect related scores of each identified prospective road further comprises the processing unit being operative to:

generate a plurality of historical scores between each identified prospective road and the historical data; and generate the overall score based on the plurality of aspect related scores and the plurality of historical scores.

10. The navigation system of claim 9, wherein the processing unit being operative to generate the historical score for each identified prospective road according to the obtained historical data comprises the processing unit being further operative to:

determine a historical prior road score according to whether each identified prospective road has been a previously selected prospective road in the historical data.

11. The navigation system of claim 10, wherein the processing unit being operative to generate the historical score for each identified prospective road according to the obtained historical data further comprises the processing unit being operative to:

obtain connectivity data for each identified prospective road; and determine a historical connectivity score according to whether each identified prospective road is reachable from the previously selected prospective road in the historical data.

12. The navigation system of claim 11, wherein the processing unit being operative to generate historical score for each identified prospective road according to the obtained historical data further comprises the processing unit being operative to:

obtain the current speed; and determine a historical speed score according to the current speed and a previous speed for a previous route location on each identified prospective road in the historical data.

13. The navigation system of claim 12, wherein the processing unit being operative to generate historical score for each identified prospective road according to the obtained historical data further comprises the processing unit being operative to:

obtain a current heading for the reported location;

determine a historical heading score according to a difference between the current heading for the reported location and a previous heading for a previous route location on each identified prospective road in the historical data.

14. A computer-implemented navigation system for resolving discrepancies between a reported location and route data, the navigation system comprising:

a location subsystem, wherein the location subsystem provides a reported location to the navigation system;

a memory storage; and a processing unit coupled to the memory storage, the location subsystem, and the navigation system, wherein the processing unit is configured to:

determine a radius for identifying a plurality of prospective roads within the radius based on a current speed obtained from one of the navigation system, the location subsystem, and a speedometer of a vehicle in operation with the navigation system, identify a plurality of prospective roads as those roads in the route data that have a road segment within the radius of the reported location, obtain historical data corresponding to a plurality of previous route locations for each identified prospective road, generate a plurality of aspect related scores for each identified prospective road according to a plurality of aspects of each identified prospective road, generate a historical score for each identified prospective road according to the obtained historical data, normalize each of the plurality of aspect related scores into a common range of values by translating each of the plurality of aspect related scores into the common range of values comparable to other scores, determine an overall score for each prospective road according to a cumulation of the normalized aspect related scores and the historical score by weighting at least one of the plurality of aspect related scores of each identified prospective road and the historical score, select a prospective road of the plurality of prospective roads with the best overall score, and identify a position on the selected prospective road as the route location.

15. The navigation system of claim 14, wherein the processing unit is further operative to:

apply a predetermined weighting function to the normalized score for each identified prospective road.

16. The navigation system of claim 14, wherein the processing unit is further operative to:

generate a plurality of historical scores for each identified prospective road in relation to the reported location and according to the obtained historical data of previous route locations on each identified prospective road.

17. The navigation system of claim 14, wherein the location subsystem comprises a global positioning system (GPS) unit.

18. The navigation system of claim 14, wherein the processing unit being operative to generate the historical score for each identified prospective road according to the obtained historical data comprises the processing unit being further operative to:

determine a historical prior road score according to whether each identified prospective road has been a previously selected prospective road in the historical data.

19. The navigation system of claim 18, wherein the processing unit being operative to generate the historical score for each identified prospective road according to the obtained historical data further comprises the processing unit being operative to:

obtain connectivity data for each identified prospective road; and determine a historical connectivity score according to whether each identified prospective road is reachable from the previously selected prospective road in the historical data.

* * * * *